(12) United States Patent
Eriksson et al.

(10) Patent No.: US 6,206,777 B1
(45) Date of Patent: Mar. 27, 2001

(54) BOARD-MOUNTED NOZZLE WITH GUIDE VANES

(75) Inventors: Harry Eriksson, Trollhattan; Patrik Svensson, Vanersborg, both of (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/308,874

(22) PCT Filed: Nov. 25, 1997

(86) PCT No.: PCT/SE97/01982

§ 371 Date: Aug. 9, 1999

§ 102(e) Date: Aug. 9, 1999

(87) PCT Pub. No.: WO98/23459

PCT Pub. Date: Jun. 4, 1998

(30) Foreign Application Priority Data

Nov. 25, 1996 (SE) .................................................... 9604315

(51) Int. Cl.[7] ........................................................ B60H 1/34
(52) U.S. Cl. ................................................. 454/155; 454/320
(58) Field of Search ................................. 454/155, 313, 454/315, 318, 319, 320

(56) References Cited

U.S. PATENT DOCUMENTS

| 4,545,294 | * | 10/1985 | Dayus | 454/320 |
| 5,176,571 | * | 1/1993 | Fujihara et al. | 454/320 |

FOREIGN PATENT DOCUMENTS

| 3-84357 | * | 4/1991 | (JP) | 454/319 |
| 4-55657 | * | 2/1992 | (JP) | 454/319 |

* cited by examiner

Primary Examiner—Harold Joyce
(74) Attorney, Agent, or Firm—Brooks & Kushman P.C.

(57) ABSTRACT

A board-mounted nozzle for ventilation and climate control installations which is intended primarily for motor vehicle compartments and which comprises a frame (1) supporting parallel interconnected guide vanes (2) which are hingedly mounted in the frame for pivotal movement to direct an air flow passing through the frame. Each guide vane (2) is formed with a recess (4) on at least one of its end faces the nozzle further comprises pivot pins (8) which are secured in the frame (1) in a resiliently flexible manner in order to exert a pushing force on these guide vanes (2).

16 Claims, 1 Drawing Sheet

BOARD-MOUNTED NOZZLE WITH GUIDE VANES

The present invention relates to a board-mounted nozzle for ventilation and climate control installations which is intended primarily for motor vehicle compartments and which comprises a frame supporting parallel interconnected guide vanes which are hingedly mounted in the frame for pivotal movement to direct an air flow passing through the frame.

In ventilation and climate control installations in for instance motor vehicles, manually adjustable nozzles are used to direct the air flow in the compartment as desired. Normally, nozzles used for this purpose comprise a frame and articulated guide vanes which are mounted in the frame for pivotal movement therein. As rule, the guide vanes are disposed in parallel relationship and may also be arranged in two layers the directions of extension of which are at right angles to one another. One problem encountered in guide vanes of this kind is that they may generate noise as the passing air flow make them vibrate and shake. To prevent this from happening springs of some kind are sometimes used, urging the guide vanes against one of the side walls in which they are mounted. A nozzle of this kind is described for instance in Wo 93/23261.

However, this type of nozzles often are difficult to mount, which makes them expensive. Fulcrum pins may be provided at each And face of the guide vanes to be inserted into recesses formed for that purpose in opposite faces of the frame. To mount guide vanes of this kind, they must be bent into arcuate shape to make it possible to insert them in position. This mounting method is quite a complicated one, and in addition it involves risks that the inner face of the frame will be scratched.

Alternatively, one or possibly both pivot pins could be replaced by separate pivot pins. The use of such separate pins facilitates the mounting of-the vanes, since they can be placed in position without first having to be bent, whereupon the pivot pins may be inserted through apertures formed in the frame and further into recesses formed for the purpose in the guide vanes. However, this is still a comparatively complicated mounting process, particularly when a spring means of some kind is to be applied between the guide vanes and one of the frame walls. Furthermore, this solution is conditioned on a large number of the components, such as pins and springs, being made from a different material than the rest of the nozzle, for example from a metal. This is unfavourable from an environmental point of view, since it reduces the recyclability of the product.

The object of the present invention is to completely or at least partly eliminate the above problems inherent in prior-art technology.

This object is achieved by means of a board-mounted nozzle with guide vanes, as defined in claim 1.

Figure 1:
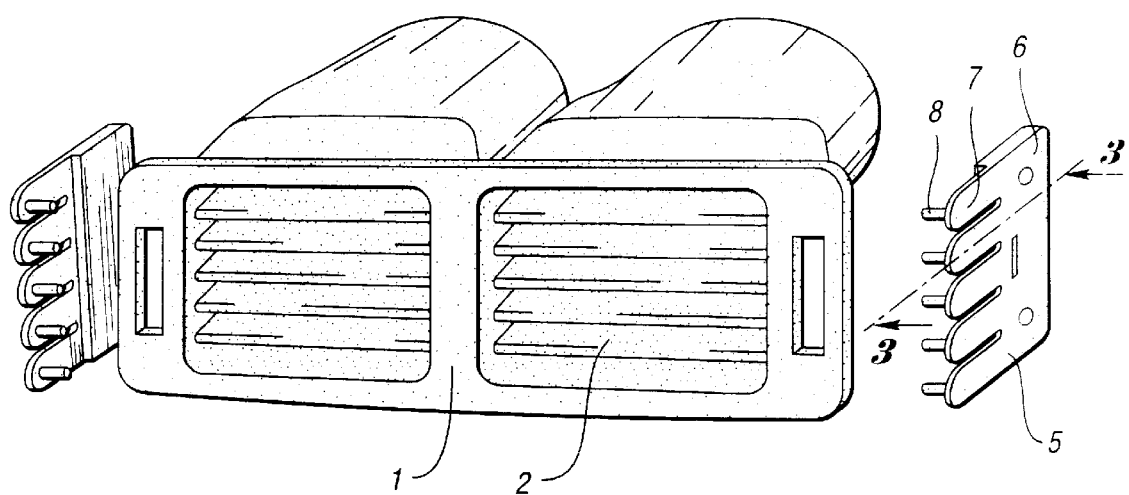
Figure 2:
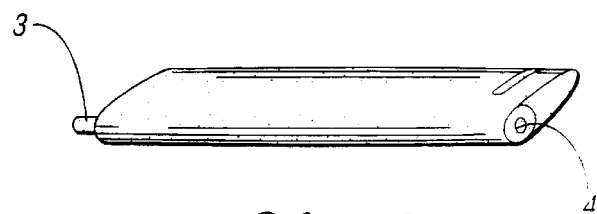
Figure 3A:
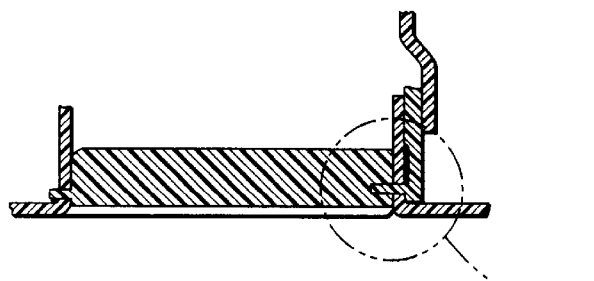
Figure 3B:
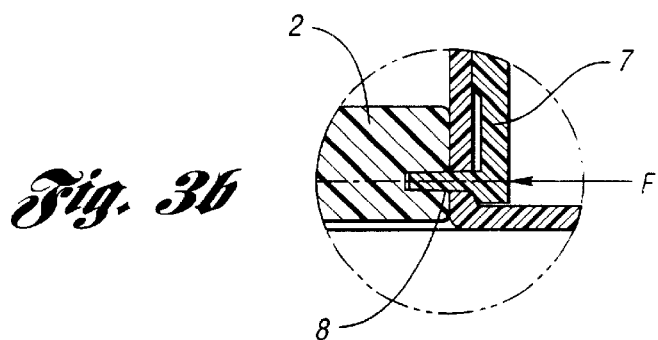

The invention will be described in more detail for exemplifying purposes by way of one embodiment and with reference to the accompanying drawing, wherein, FIG. 1 is a view, partly exploded, of a board-mounted nozzle in accordance with the invention, FIG. 2 is a view of a guide vane for use with the nozzle in FIG. 1, and FIG. 3 is a cross-sectional view taken on line III—III of FIG. 1.

FIG. 1 illustrates one embodiment of a board-mounted nozzle in accordance with the invention. This nozzle comprises a frame 1 in which guide vanes 2 are mounted for pivotal movement. The guide vanes are pivotable about their longitudinal axes by means of shaft means which also serve to attach the vanes in the oppositely positioned frame walls. Preferably, the guide vanes are interconnected in such a manner that irrespective of their pivotal position, their planar extensions are always in parallel with one another.

As illustrated in FIG. 2, each guide vane is formed at one of its end faces with a projecting pin 3, and at its opposite end face with a recess.

Furthermore, the nozzle comprises a resilient retainer member 5 (see FIG. 1). Said retainer member 5 comprises a base part 6 intended to be secured to the external face of the frame, and a number of tongues 7 projecting in parallel relationship from the base part. The tongues are resiliently flexible relative to the base part and are formed with projecting pivot pins positioned at a distance from the base part. Upon attachment of the retainer member 5 to the external face of the frame, these pivot pins are introduced in and penetrate through apertures of matching configuration formed in the frame face, and so as to project further into the recesses 4 formed in the guide vanes, as illustrated in FIG. 3. Owing to this arrangement, the resilient tongues exert a pushing force F on the pivot pins; which in turn presses against the guide vanes. As a result, the guide vanes are kept firmly in position and are prevented from moving in the direction of their lengthwise extension, thus obviating the generation of noise.

In the retainer member 5 illustrated in FIG. 1 each base piece 6 is formed with a plurality of tongues 7. This configuration is a practical one since it reduces the number of separate components and consequently facilitates the mounting operation. Retainer members comprising a different number of tongues than five, as illustrated in FIG. 1, are likewise possible, however. For example, it is quite conceivable to form the detainment member with one single tongue, in which case each pivot pin is supported on its separate retainer member.

The retainer member could be attached to the external face of the frame by screwing, gluing or some other suitable method.

All components of the board-mounted nozzle in accordance with the invention could be manufactured from a plastics material, thus making the product recyclable and consequently less harmful to the environment. The retainer member should, however, be manufactured from a resilient material, such as e.g. acetal resins (POM).

A board-mounted nozzle designed in accordance with the invention does not rattle or generate other noise while at the same time it is recyclable and easy to assemble and fit.

A number of varieties of the invention are, however, possible. For instance, retainer members may be used to secure both end faces of the guide vanes, a different number of guide vanes may be used, the guide vanes could be disposed vertically instead of horizontally, or both horizontally and vertically in a rear layer, and so on. Such equivalent varieties of the invention must be regarded to be within the scope of the invention as the latter is defined in the appended claims.

What is claimed is:

1. A board-mounted nozzle for ventilation and climate control installations which is intended primarily for motor vehicle compartments and which comprises a frame (1) supporting parallel interconnected guide vanes (2) which are hingedly mounted in the frame for pivotal movement to direct an air flow passing through the frame, characterized in that each guide vane (2) is formed with a recess (4) on at least one of its end faces, and in that-the nozzle further comprises pivot pins (8) which are secured in the frame (1)

in a resiliently flexible manner, said pivot pins arranged to be received in said recesses (4) in order to exert a pushing force on said guide vanes (2).

2. A board-mounted nozzle as claimed in claim 1, further comprising a retainer member (5) secured to the frame and including the pivot pins (8).

3. A board-mounted nozzle as claimed in claim 1, further comprising a base part (6) secured to the frame (1), and several resilient tongues (7) joined to the base part (6), wherein each pivot pin (8) is arranged on a separate tongue (7).

4. A board-mounted nozzle as claimed in claim 1, characterized in that all components of the nozzle are made from plastics.

5. A board-mounted nozzle as claimed in claim 1, characterized in that the pivot pins (8) extend through an external face of the frame (1) and into the recesses (4) formed in the guide vanes.

6. A board-mounted nozzle as claimed in claim 1, characterized in that the guide vanes (2) are formed with recesses (4) only in one of the end faces, and are formed on the opposite end face with projecting pins (3) which are integrated with the guide vane and are intended to be inserted into correspondingly configured internal recesses formed in the frame.

7. A board-mounted nozzle as claimed in claim 2, characterized in that the retainer member (5) includes a base part (6) connected to the frame (1) and several resilient tongues (7) joined to the base part (6), and in that each pivot pin (8) is arranged on a separate tongue (7).

8. A board-mounted nozzle as claimed in claim 2, characterized in that all components of the nozzle are made from plastics.

9. A board-mounted nozzle as claimed in claim 3, characterized in that all components of the nozzle are made from plastics.

10. A board-mounted nozzle as claimed in claim 2, characterized in that the pivot pins (8) extend through an external face of the frame (1) and into the recesses (4) formed in the guide vanes.

11. A board-mounted nozzle as claimed in claim 3, characterized in that the pivot pins (8) extend through an external face of the frame (1) and into the recesses (4) formed in the guide vanes.

12. A board-mounted nozzle as claimed in claim 4, characterized in that the pivot pins (8) extend through an external face of the frame (1) and into the recesses (4) formed in the guide vanes.

13. A board-mounted nozzle as claimed in claim 2, characterized in that the guide vanes (2) are formed with recesses (4) only in one of the end faces, and are formed on the opposite end face with projecting pins (3) which are integrated with the guide vane and are intended to be inserted into correspondingly configured internal recesses formed in the frame.

14. A board-mounted nozzle as claimed in claim 3, characterized in that the guide vanes (2) are formed with recesses (4) only in one of the end faces, and are formed on the opposite end face with projecting pins (3) which are integrated with the guide vane and are intended to be inserted into correspondingly configured internal recesses formed in the frame.

15. A board-mounted nozzle as claimed in claim 4, characterized in that the guide vanes (2) are formed with recesses (4) only in one of the end faces, and are formed on the opposite end face with projecting pins (3) which are integrated with the guide vane and are intended to be inserted into correspondingly configured internal recesses formed in the frame.

16. A board-mounted nozzle as claimed in claim 5, characterized in that the guide vanes (2) are formed with recesses (4) only in one of the end faces, and are formed on the opposite end face with projecting pins (3) which are integrated with the guide vane and are intended to be inserted into correspondingly configured internal recesses formed in the frame.

* * * * *

UNITED STATES PATENT AND TRADEMARK OFFICE
CERTIFICATE OF CORRECTION

PATENT NO. : 6,206,777 B1      Page 1 of 1
DATED : March 27, 2001
INVENTOR(S) : Harry Eriksson et al.

It is certified that error appears in the above-identified patent and that said Letters Patent is hereby corrected as shown below:

<u>Column 2, claim 1,</u>
Line 66, please delete "that-the" and insert therein -- that the --.

Signed and Sealed this

Twenty-fifth Day of December, 2001

Attest:

JAMES E. ROGAN
*Attesting Officer*     *Director of the United States Patent and Trademark Office*